(12) United States Patent  (10) Patent No.: US 7,728,221 B2
Lin  (45) Date of Patent: Jun. 1, 2010

(54) SOLAR POWER GENERATING DEVICE

(75) Inventor: Chien-Feng Lin, Hsinchu (TW)

(73) Assignee: Pacific Speed Limited, Wanchai (HK)

( * ) Notice: Subject to any disclaimer, the term of this patent is extended or adjusted under 35 U.S.C. 154(b) by 316 days.

(21) Appl. No.: 11/826,652

(22) Filed: Jul. 17, 2007

(65) Prior Publication Data
US 2009/0020152 A1 Jan. 22, 2009

(51) Int. Cl.
*H01L 31/00* (2006.01)
*H01L 31/042* (2006.01)
(52) U.S. Cl. .................. 136/256; 136/259; 136/246
(58) Field of Classification Search .......... 136/243–265
See application file for complete search history.

(56) References Cited

U.S. PATENT DOCUMENTS 4,234,352 A * 11/1980 Swanson .................. 136/253
5,096,505 A * 3/1992 Fraas et al. ................ 136/246

* cited by examiner

*Primary Examiner*—Jeffrey T. Barton
*Assistant Examiner*—Allison Bourke
(74) *Attorney, Agent, or Firm*—Muncy, Geissler, Olds & Lowe, PLLC

(57) ABSTRACT

A solar power generating device includes a first conductive body, a second conductive body and an insulating body sequentially disposed on the first conductive body, and a solar energy converting unit. The first conductive body has a conducting post upward projected from a hollow sleeve portion of the insulating body and a through opening of the second conductive body, so that a conducting section at a top of the conducting post is exposed at the insulating sleeve portion. The solar energy converting unit is mounted on the conducting section of the first conductive body and in electric contact with the second conductive body. With these arrangements, the solar power generating device may be mounted on a circuit board without the need of distinguishing the polarities of electrodes, and can therefore be easily mounted to and dismounted from the circuit board and be conveniently replaced when necessary.

3 Claims, 6 Drawing Sheets

SOLAR POWER GENERATING DEVICE

FIELD OF THE INVENTION

The present invention relates to a solar power generating device, and more particularly to a solar power generating device that could be easily mounted to and dismounted from a circuit board and therefore be conveniently replaced when necessary.

BACKGROUND OF THE INVENTION

Considering the depletion of petrochemical fuels available on the earth and the worsening greenhouse effect, energy sources, such as water power generation, wind power generation, geothermal power generation, and solar power generation that do not cause environment pollution have been gradually exploited for use. Among others, solar power generation is more frequently utilized by people because it requires only a solar collector panel to collect solar energy. However, to mount a conventional solar collector panel, a user has to screw a support frame to the ground first, and then screws the solar collector panel to the support frame. The user also has to distinguish the positive electrode from the negative electrode of the solar collector panel, and then correctly connects the solar collector panel to other power-consuming device or power accumulating means. Therefore, the mounting of the conventional solar collector panel involves very complicate and troublesome procedures. Similarly, a lot of complicate and troublesome procedures are also required to dismount or replace the conventional solar collector panel. These disadvantages prevent the conventional solar collector panel from being widely accepted for use in different applications.

It is therefore tried by the inventor to develop a solar power generating device that can be very easily mounted to and dismounted from a circuit board, and accordingly, be conveniently replaced when necessary.

SUMMARY OF THE INVENTION

A primary object of the present invention is to provide a solar power generating device that can be easily mounted on and dismounted from a circuit board, and can therefore be conveniently replaced when necessary.

To achieve the above and other objects, the solar power generating device of the present invention includes a first conductive body having an upward projected conducting post; an insulating body having an insulating sleeve portion, and being disposed on the first conductive body with the insulating sleeve portion fitted around the conducting post, such that a conducting section at a top of the conducting post is exposed at the insulating sleeve portion; a second conductive body having a through opening, and being disposed on the insulating body to electrically isolate from the first conductive body with the insulating sleeve portion of the insulating body upward extended through the opening; and a solar energy converting unit including a first electrode in electric contact with the conducting section of the first conductive body and at least one second electrode in electric contact with the second conductive body.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
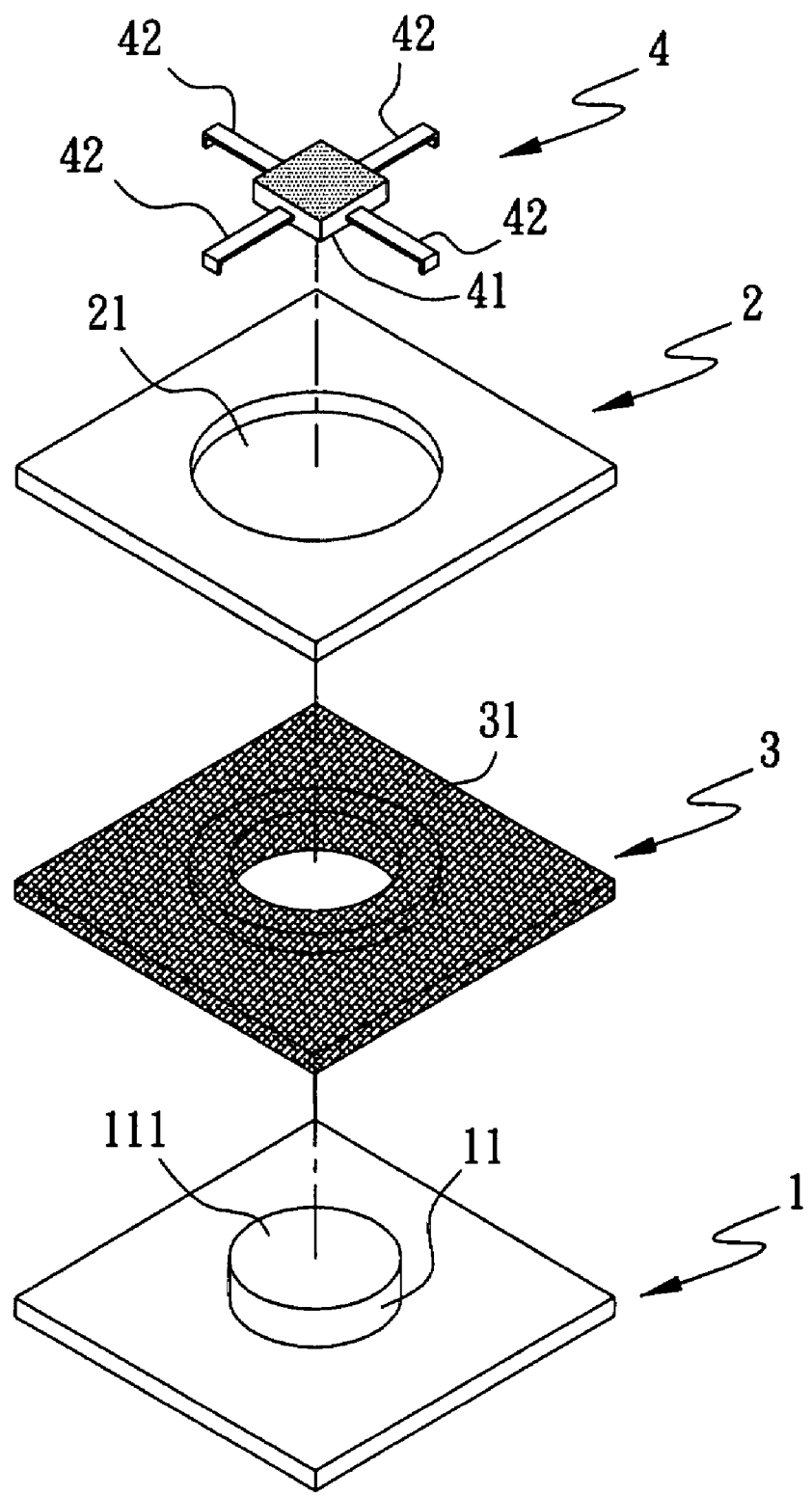
FIG. 1 is an exploded perspective view of a solar power generating device according to a first preferred embodiment of the present invention.
Figure 2:
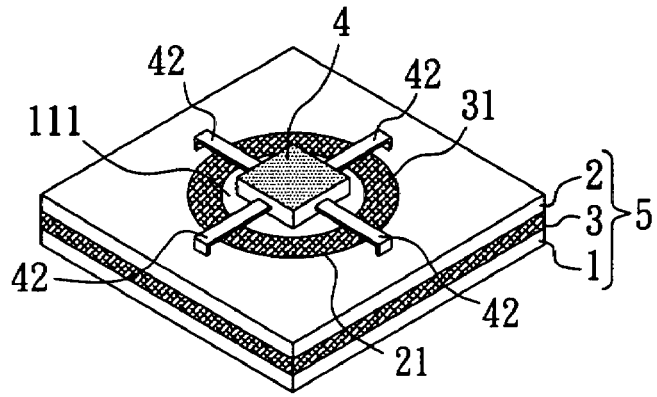
FIG. 2 is an assembled view of FIG. 1.

Please refer to FIGS. 1 and 2 that are exploded and assembled perspective views, respectively, of a solar power generating device according to a first preferred embodiment of the present invention. As shown, in the first preferred embodiment, the solar power generating device includes a first conductive body 1, a second conductive body 2, an insulating body 3, and a solar energy converting unit 4.

The first conductive body 1 includes an upward projected cylindrical conducting post 11.

The insulating body 3 includes a hollow cylindrical insulating sleeve portion 31, such that the insulating body 3 may be disposed on the first conductive body 1 with the hollow cylindrical insulating sleeve portion 31 fitted around the cylindrical conducting post 11. It is noted a conducting section 111 at a top of the conducting post 11 is exposed at the sleeve portion 31.

The second conductive body 2 includes a through opening 21 and is disposed on the insulating body 3, such that the hollow cylindrical insulating sleeve portion 31 of the insulating body 3 is upward extended through the opening 21. Meanwhile, the second conductive body 2 is electrically isolated from the first conductive body 1 by the insulating body 3.

The solar energy converting unit 4 includes a first electrode 41 in electric contact with the conducting section 111 and four second electrodes 42 in electric contact with the second conductive body 2.

Figure 3:
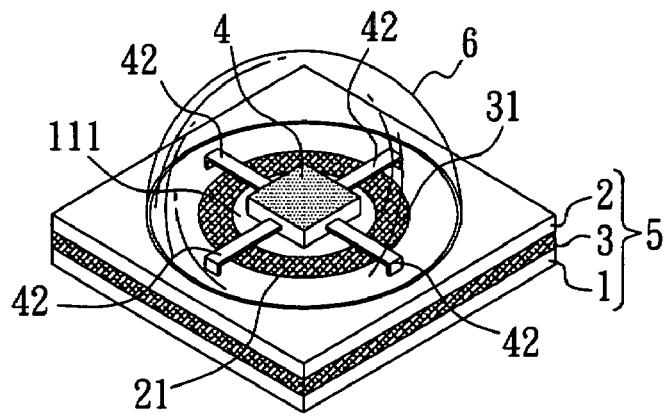
FIG. 3 is an assembled perspective view of a solar power generating device according to a second preferred embodiment of the present invention.
Figure 4:
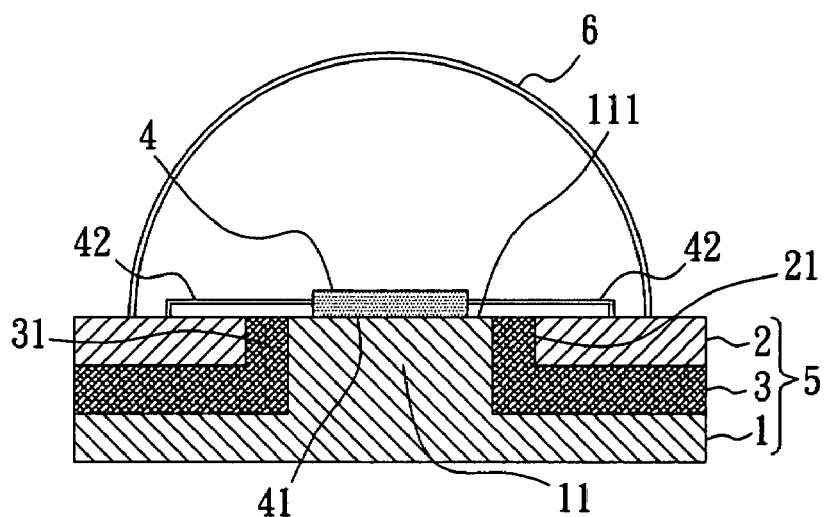
FIG. 4 is a vertical sectional view of FIG. 3.

Please refer to FIGS. 3 and 4, which are assembled perspective view and vertical sectional view, respectively, of a solar power generating device according to a second preferred embodiment of the present invention is shown. The second embodiment is generally structural similar to the first embodiment, except for a solar-collecting hood 6. The solar-collecting hood 6 is closed on a top of the second conductive body 2 to shield the solar energy converting unit 4 and the four second electrodes 42 from destructive factor in the ambient environment, and to focus sun light on the solar energy converting unit 4 to enable increased solar-power absorption of the solar energy converting unit 4.

When the insulating body 3 has been disposed on the first conductive body 1 and the second conductive body 2 is sequentially disposed on the insulating body 3, a main body 5 in the shape of a square base is formed.

Figure 5:
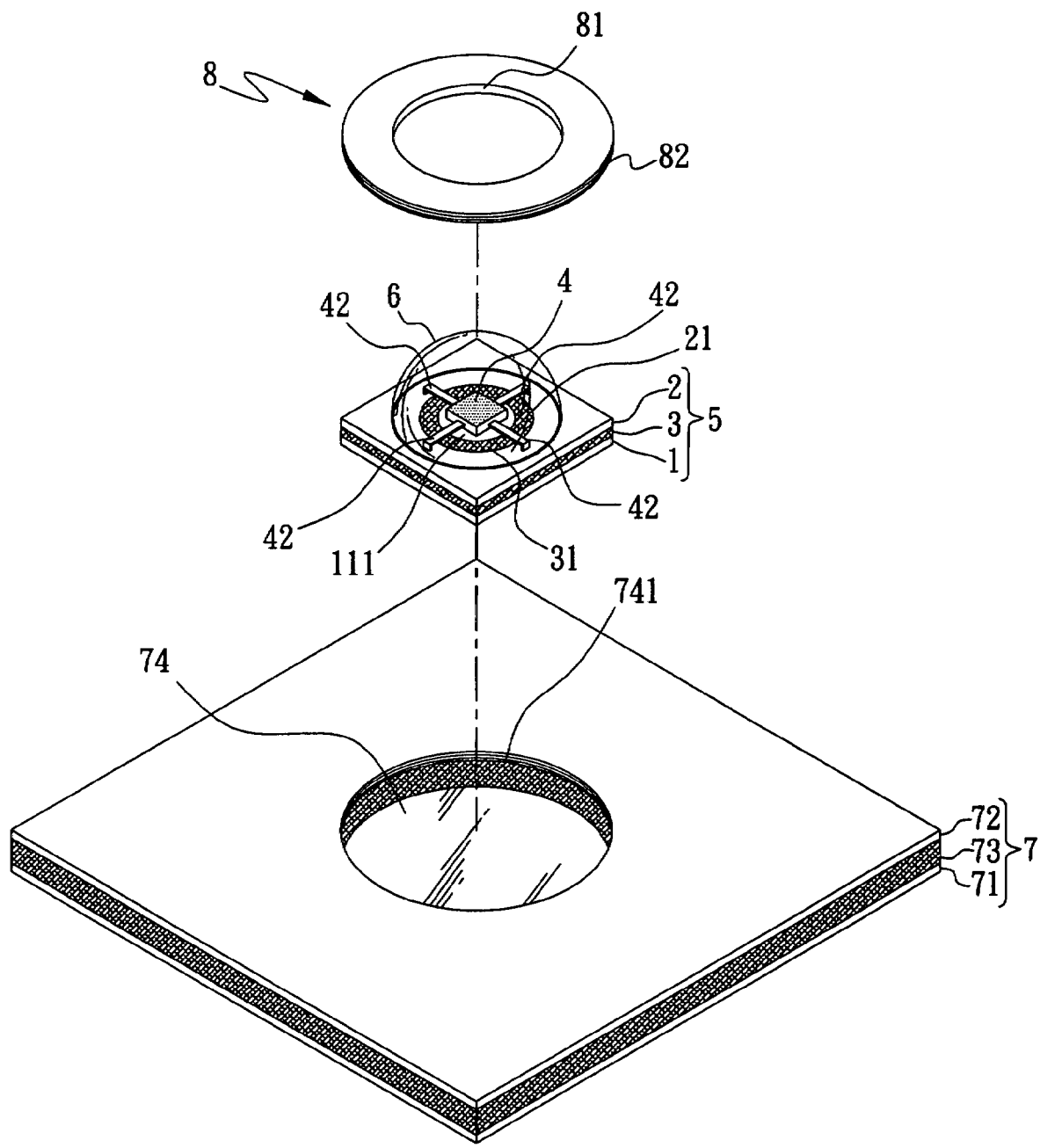
FIG. 5 is an exploded view showing a first example of application of the solar power generating device according to the second preferred embodiment of the present invention.
Figure 6:
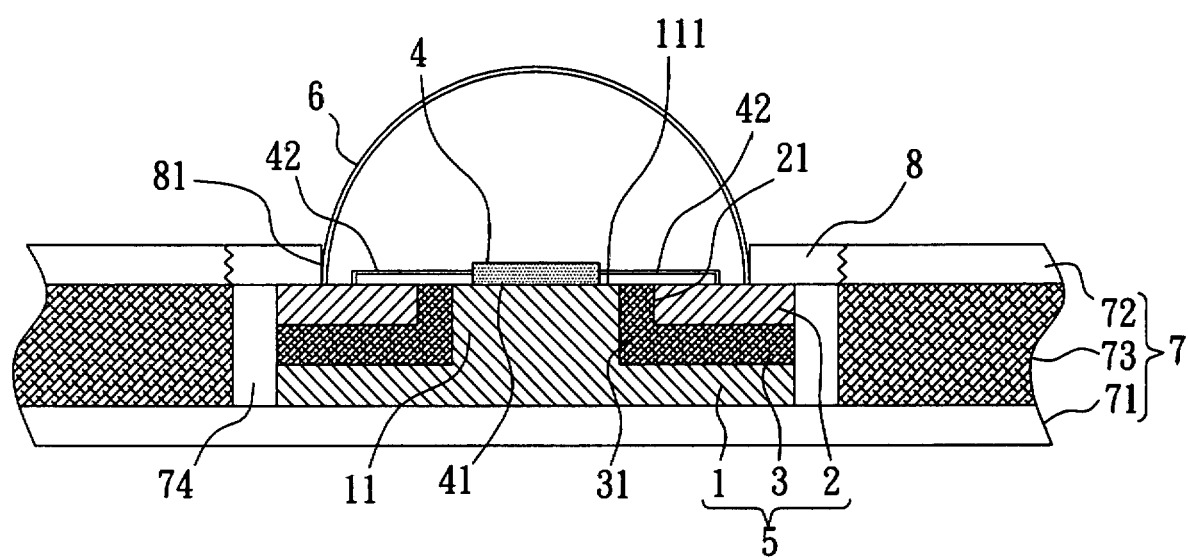
FIG. 6 is an assembled vertical sectional view of FIG. 5.

FIGS. 5 and 6 are exploded and assembled vertical sectional views, respectively, showing a first example of application of the solar power generating device according to the second embodiment of the present invention. As shown, the solar power generating device may be mounted on a circuit board 7, which includes a first conducting layer 71, a second conducting layer 72, and an insulating layer 73. The insulating layer 73 is located on the first conducting layer 71, and the second conducting layer 72 is located on the insulating layer 73. The three-layer circuit board 7 is machined from a top thereof to penetrate the second conducting layer 72 and the insulating layer 73 to provide at least one round-sectioned receiving recess 74. An inner peripheral wall surface of the receiving recess 74 adjacent to the second conducting layer 72 is provided with female screw threads 741. The solar power generating device may be mounted in the receiving recess 74 from the top of the circuit board 7 and held thereto by engaging an upper cover plate 8 with the receiving recess 74. The upper cover plate 8 has a central opening 81 and is provided on an outer peripheral wall surface with male screw threads 82 corresponding to the female screw threads 741 in the receiving recess 74. When the solar power generating device has been disposed in the receiving recess 74, the upper cover plate 8 may be screwed into the receiving recess 74 to hold the solar power generating device in the receiving recess 74 while allowing the solar-collecting hood 6 to upward protrude from the central opening 81. The solar power generating device is disposed in the receiving recess 74 with the first conductive body 1 in electric contact with the first conducting layer 71 of the circuit board 7 and the second conductive body 2 in electric contact with the second conducting layer 72 of the circuit board 7 via the upper cover plate 8.

Figure 7:
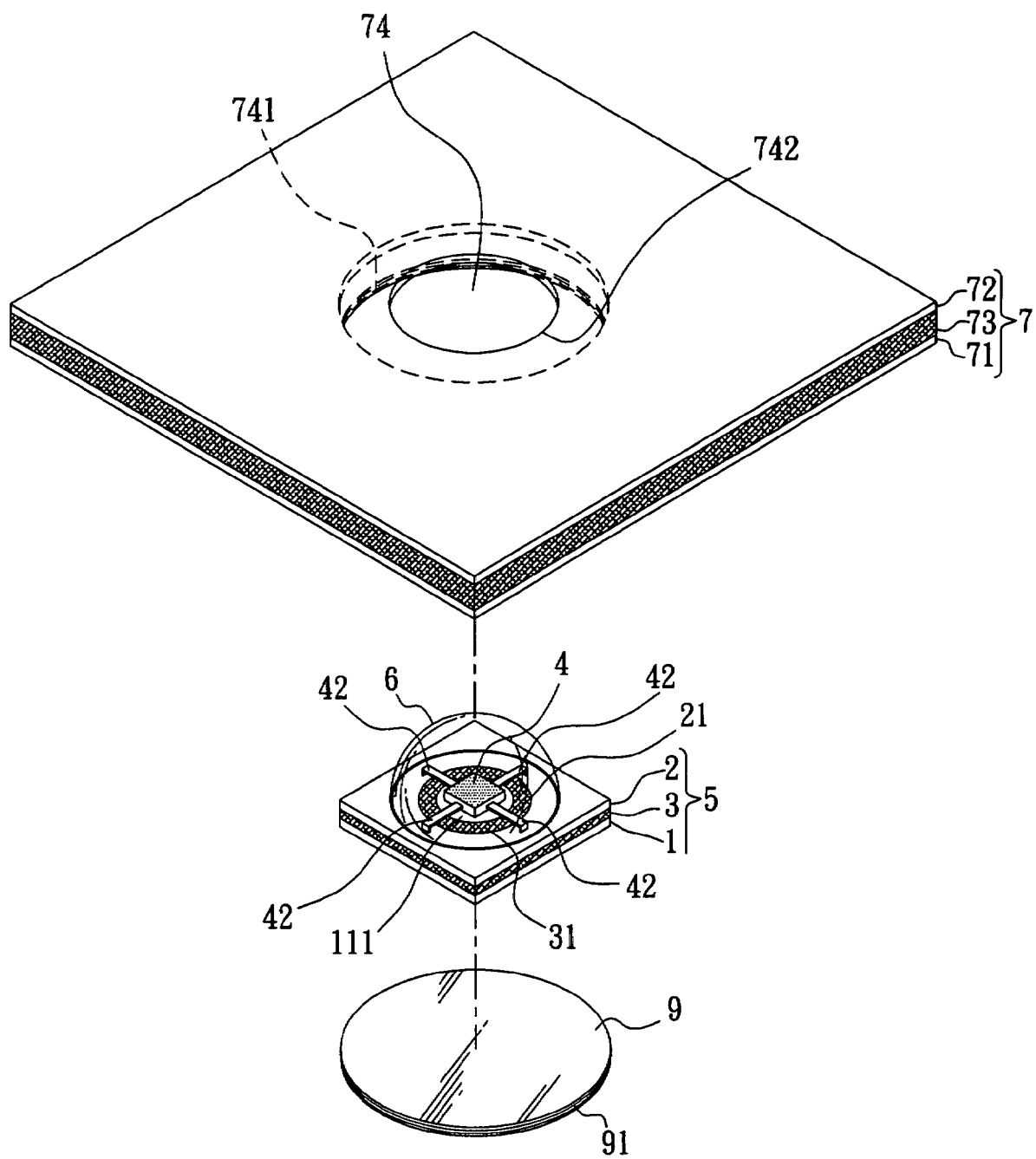
FIG. 7 is an exploded view showing a second example of application of the solar power generating device according to the second preferred embodiment of the present invention.
Figure 8:
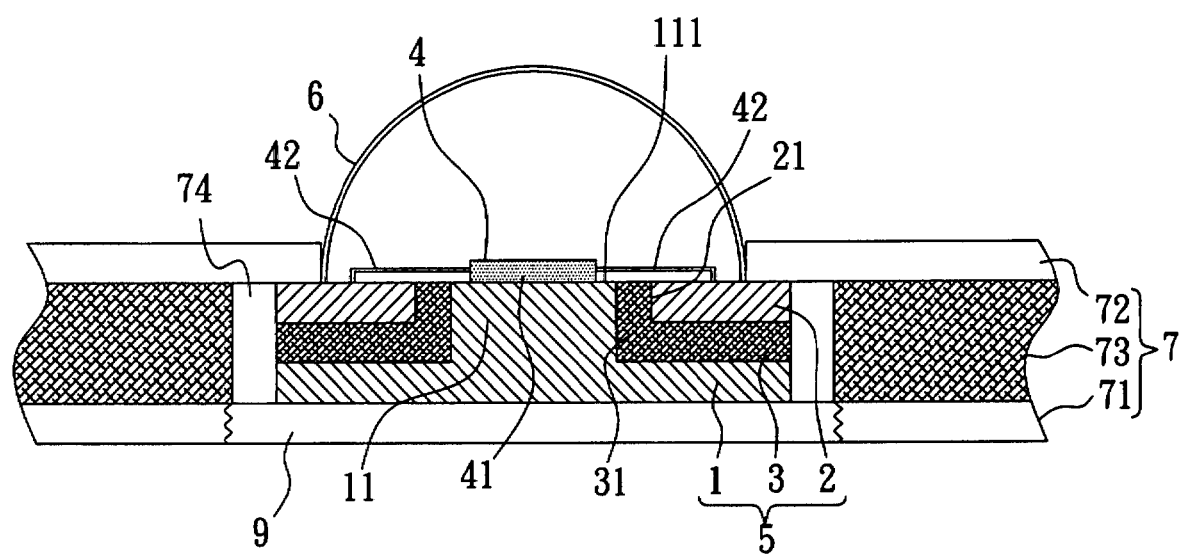
FIG. 8 is an assembled vertical sectional view of FIG. 7.

FIGS. 7 and 8 are exploded and assembled vertical sectional views, respectively, showing a second example of application of the solar power generating device according to the second embodiment of the present invention. As shown, the solar power generating device may be mounted on a circuit board 7, which includes a first conducting layer 71, a second conducting layer 72, and an insulating layer 73. The insulating layer 73 is located on the first conducting layer 71, and the second conducting layer 72 is located on the insulating layer 73. The three-layer circuit board 7 is machined from a bottom thereof to provide at least one round-sectioned and downward opened receiving recess 74. An inner peripheral wall surface of the receiving recess 74 adjacent to the first conducting layer 71 is provided with female screw threads 741. And, the second conducting layer 72 forming a top of the open-bottom receiving recess 74 is provided with a size-reduced central opening 742. The solar power generating device may be mounted in the receiving recess 74 from the bottom of the circuit board 7 and held thereto by engaging a lower cover plate 9 with the open bottom of the receiving recess 74. The lower cover plate 9 is provided on an outer peripheral wall surface with male screw threads 91 corresponding to the female screw threads 741 in the receiving recess 74. When the solar power generating device has been disposed in the receiving recess 74, the lower cover plate 9 may be screwed into the receiving recess 74 to hold the solar power generating device in the receiving recess 74 while allowing the solar-collecting hood 6 to upward protrude from the central opening 742. The solar power generating device is disposed in the receiving recess 74 with the first conductive body 1 in electric contact with the first conducting layer 71 of the circuit board 7 via the lower cover plate 9, and the second conductive body 2 in electric contact with the second conducting layer 72 of the circuit board 7.

When the solar power generating device has been fixed in the receiving recess 74, the solar energy converting unit 4 absorbs and converts solar energy into electric energy, which is transferred from the first electrode 41 and the second electrodes 42 via the first conductive body 1 and the second conductive body 2, respectively, to the first conducting layer 71 and the second conducting layer 72, respectively, for powering other power-consuming components (not shown) or storing in power accumulating means (not shown) provided on the circuit board 7.

The solar power generating device of the present invention can be mounted without the need of distinguishing the polarities of electrodes. A user needs only to dispose the solar power generating device in the receiving recess formed on the circuit board and close the cover plate to the receiving recess. Therefore, the solar power generating device of the present invention is easy to mount to and dismount from the circuit board, and can be conveniently replaced when necessary.

In the solar power generating device of the present invention, the second conductive body, the insulating body, and the first conductive body are sequentially stack with the conducting post of the first conductive body upward extended through the insulating body and the second conductive body to expose the conducting section at the sleeve portion, so that the solar-energy converting unit may be mounted on the top of the conducting section of the first conductive body and in electric contact with the second conductive body. With these arrangements, the solar power generating device of the present invention could be very easily mounted to and dismounted from a circuit board, and accordingly, be conveniently replaced when necessary. Therefore, the present invention is novel, improved, and industrially valuable for use.

What is claimed is:

1. A solar power generating device, comprising:
   a first conductive body having an upward projected cylindrical conducting post;
   an insulating body having an insulating sleeve portion; the insulating body being disposed on the first conductive body with the insulating sleeve portion fitted around the cylindrical conducting post, such that a conducting section at a top of the cylindrical conducting post is exposed at the insulating sleeve portion;
   a second conductive body having a through opening; the second conductive body being disposed on the insulating body to electrically isolate from the first conductive body with the insulating sleeve portion of the insulating body upward protruded from the through opening; and
   a solar energy converting unit including a square-shaped first electrode in electric contact with the conducting section of the first conductive body, and four second electrodes provided at four sides of the square-shaped first electrode, wherein the second electrodes extend over the insulated sleeve portion are in electric contact with the second conductive body.

2. The solar power generating device as claimed in claim 1, further comprising a solar-collecting hood closed onto a top of the second conductive body to shield the solar energy converting unit.

3. The solar power generating device as claimed in claim 1, wherein the first conductive body together with the second conductive body and the insulating body sequentially disposed on the first conductive body form a main body in the shape of a square base, wherein the first electrode of the solar energy converting unit has a smaller area than the main body.

* * * * *